United States Patent [19]
Webster

[11] Patent Number: 5,277,159
[45] Date of Patent: Jan. 11, 1994

[54] TWO STROKE DIESEL ENGINE

[76] Inventor: Gary D. Webster, Suite 102, 17 Fitzgerald Road, Nepean, Ontario, K2H 9G1, Canada

[21] Appl. No.: 981,316

[22] Filed: Nov. 25, 1992

[30] Foreign Application Priority Data

Nov. 26, 1991 [CA] Canada ................. 2056236

[51] Int. Cl.$^5$ .................. F02B 19/04; F02B 19/14
[52] U.S. Cl. ..................... 123/254; 123/257; 123/270; 123/269; 123/275
[58] Field of Search ........... 123/254, 257, 267, 269, 123/270, 271, 273, 275, 285

[56] References Cited

U.S. PATENT DOCUMENTS

| | | | |
|---|---|---|---|
| 4,508,066 | 4/1985 | Hartsock | 123/270 X |
| 4,738,227 | 4/1988 | Kamo et al. | 123/270 X |
| 4,998,517 | 3/1991 | Kawamura | 123/270 |
| 5,025,765 | 6/1991 | Kawamura | 123/254 |
| 5,054,443 | 10/1991 | Kawamura | 123/254 |

FOREIGN PATENT DOCUMENTS 188024 10/1984 Japan ........................ 123/254

Primary Examiner—Willis R. Wolfe
Attorney, Agent, or Firm—Marks & Clerk

[57] ABSTRACT

A piston and cylinder arrangment for an internal combustion engine designed to run on diesel and similar fuels, comprises a cylinder defining a main combustion chamber, a piston reciprocatable within said cylinder and having a thermally insulating plate on its upper surface, a cylinder head including a precombustion chamber, a fuel injector for injecting fuel into said precombustion chamber, and a thermally insulated block of material with high heat retention ability surrounding the precombustion chamber to maintain a high temperature a high temperature of at least about 500° C. in the precombustion chamber and thereby facilitate fuel ignition at moderate compression ratios. A mass of material with high heat retention ability is mounted on the insulated surface of the piston so as to remain at a high temperature during running of the engine and facilitate the combustion process during the downward stroke of the piston.

12 Claims, 1 Drawing Sheet

TWO STROKE DIESEL ENGINE

BACKGROUND OF THE INVENTION

1. Field of the Invention

This invention relates to a piston and cylinder arrangment for internal combustion engines, and more particularly for internal combustion engines designed to run on diesel and similar fuels.

2. Description of the Prior Art

Traditionally direct injection diesel engines that are naturally aspirated and run on heavier fuels, such as diesel, require high compressions ratios of at least 17:1, and preferably in the order of 22 to 1 for precombustion chamber engines, to operate successfully with relatively clean exhaust. This means that the engine must be made strong enough to withstand the cylinder pressures associated with these compression ratios, which in turn makes the engine heavy and cumbersome. Diesel engines have, however, certain advantages that make them suitable for applications where durability is important. The absence of an electrical ignition system makes them less prone to break down in moist environments, and their relative mechanical simplicity enhances their ruggedness. An important attractive feature of diesel engines is the lower volatility of diesel fuels, which permits the engines to be transported on aircraft or other vehicles where the high volatility of gasolines is problematic. The transportation of gasoline engines, for example for powering generator sets, is not permitted on military aircraft.

Unfortunately, the bulkiness of diesel engines has hitherto been a major disadvantage in mobile applications, especially when they have to be delivered to site by aircraft. The key to reducing the weight of the engine is to use lower compression ratios, ideally of the order of 14/15:1 or lower, as for conventional lightweight gasoline engines. Unfortunately, with these compressions ratios it is hard to get diesel fuels to ignite.

Previous attempts have been made to run an engine on diesel or kerosene-based fuels at low compression ratios using spark ignition systems. This has been recently demonstrated at South West Research Institute (SWRI) in a joint project (1) between SWRI and Sanshin Industries (a unit of Yamaha). In the SwRI/Sanshin (S/S) project, an energy cell (EC) approach was developed to improve combustion efficiency at the end of the combustion stroke. This made it possible to produce 21.3 kW (IHP) and 160 gm/hp/Hr Indicated Specific Fuel Consumption (ISFC) at 5500 rpm. The problem encountered with this system was fuel inefficiency at full and part loads. An efficient diesel engine will consume approximately 130 gm/hp/H, and the full benefit of diesel efficiency could not be realized due to heat transfer through the cylinder head via the energy cell and the low compression ratios of 10:1. Also, apart from detracting from one of the main advantages of the diesel engine, namely the absence of an electrical ignition system, such systems have not undergone much further development, as they tend to have a dirty, exhaust with a high levels of exhaust emission of mainly unburned hydrocarbons.

SUMMARY OF THE INVENTION

An object of the invention is to provide a piston and cylinder arrangment for an internal combustion engine capable of running on diesel and similar fuels at moderate to low compression ratios comparable to those found in gasoline engines.

According to the present invention there is provided a piston and Cylinder arrangment for a internal combustion engine designed to run on diesel and similar fuels, comprising a cylinder defining a main combustion chamber, a piston reciprocatable within said cylinder and having a thermally insulating plate on its upper surface, a cylinder head including a precombustion chamber, a fuel injector for injecting fuel into said precombustion chamber, a thermally insulated block of material with high heat retention ability surrounding said precombustion chamber to maintain a high temperature of at least about 500° C. in said precombustion chamber and thereby facilitate fuel ignition at low to moderate compression ratios, and a mass of material with high heat retention ability mounted on the insulated surface of said piston so as to remain at a high temperature during running of the engine and facilitate the combustion process during the downward stroke of the piston.

By forming the pre-combustion chamber in a block of material with high heat retention ability, which maintains a temperature of least 500° C., and preferably at least 650° C., and possibly as high as 900° C., efficient clean combustion can be achieved at moderate compression ratios of 14/15:1 or possibly lower, which are similar to those found in a conventional gasoline engine.

The engine is preferably of variable geometry design with a protrusion on the piston mass, also made of a material of high temperature capability and heat retention ability, designed to enter the pre-combustion chamber at the top of the stroke of the piston (TDC). The variable geometry design reduces aerodynamic losses due to turbulence, but at the same time the piston protrusion also maintains a high temperature, in the order of 700° C., and serves to complete the combustion process during the power stroke.

The thermally insulating plate is preferably made of ceramic material such as a zirconia based material and can be monolithic or fibrous.

The material with high heat retention ability is preferably a silicon nitride or silicon carbide based composite, although any high-temperature metal alloy may be employed. A suitable composite is KN3 manufactured by Electrofuel Manufacturing Company Ltd., which has the following properties: hardness 16–17 gpa, fracture toughness 6–8 mpa m$^{178}$ Weibull modulus >14, flexural strength 750–1000 mpa, thermal shock resistance >1200° C., shear modulus 120–140 gpa, Young's modulus 300–350 gpa, Poisson's ratio 0.22, coefficient of thermal expansion $3.5*10^{-6}$/°C., decomposition temperature 1850° C., density 3–4 g/cm$^3$.

The piston protrusion preferably has a frusto-conical base surrounded by a ring of 7.7 INCOLOY 909 TM alloy. This is a nickel-iron-cobalt alloy whose outstanding characteristics are a constant low coefficent of thermal expansion and high strength at high temperatures. The nominal composition in wt% is nickel 38%, cobalt 13%, iron 42%, niobium 4.7%, titanium 1.5%, silicon 0.4%, aluminum 0.03%, and carbon 0.01%. The surrounding ring maintains a much lower temperature than the piston protrusion, in the order of 350° to 400° C. during the combustion process, which is more normal for the surface of the piston in a conventional diesel engine. The cylinder head and cylinder walls are also preferably made of 7.7 INCOLOY 909 TM alloy, with the piston being made of aluminum for lightness.

The engine is preferably a two-stroke engine with intake and exhaust ports in the cylinder liner, although the invention can be equally well applied to a four-stroke engine.

BRIEF DESCRIPTION OF THE DRAWINGS

The invention will now be described in more detail, by way of example only, with reference to the accompanying drawings, in which the single figure is a diagrammatic cross-section through a piston and cylinder arrangment for an engine in accordance with the invention.

Referring to the Figure, the piston and cylinder arrangment, which forms part of a two-stroke internal combustion engine (not shown), comprises a cylinder including a liner 1 of 7.7 INCOLOY 909 TM alloy and a carbon steel casing 2. An aluminum piston 3 is mounted for reciprocating movement in the cylinder on the end 4 of a piston rod (not shown).

Figure 1:
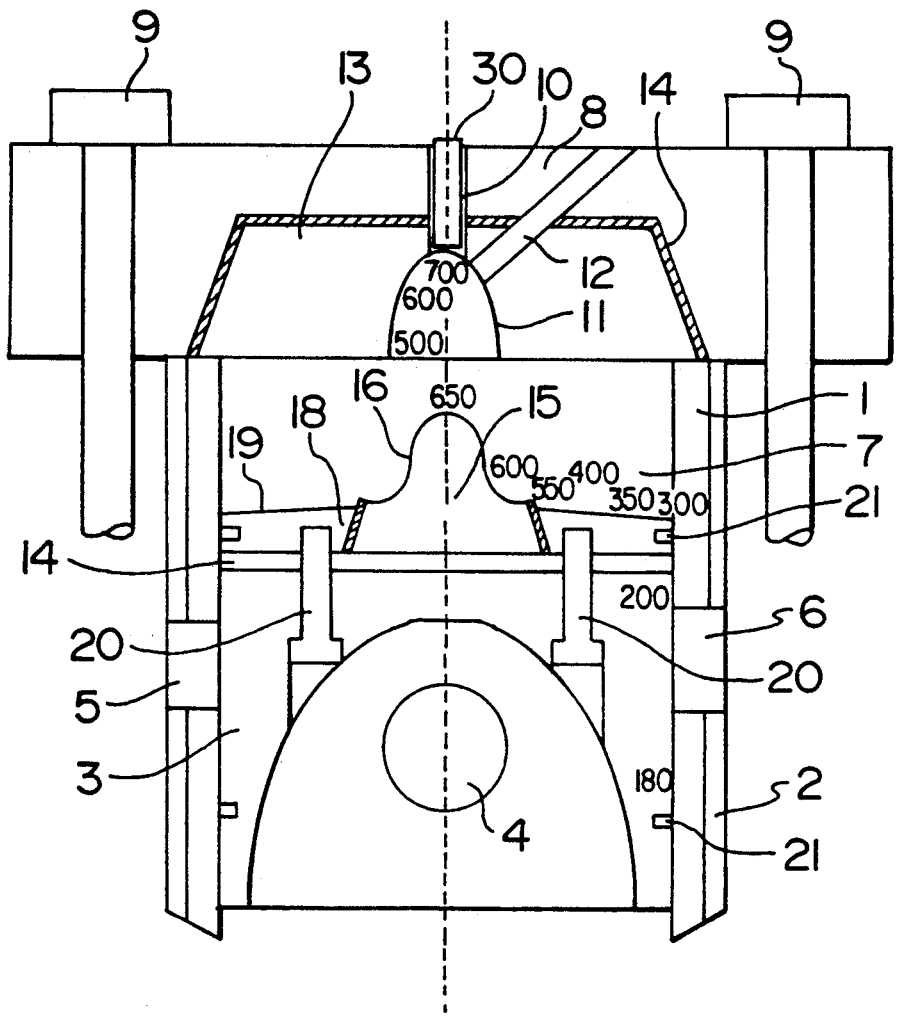

The cylinder has an intake port 5 diametrically opposed to an exhaust port 6. A blower (not shown) blows air at high pressure into combustion chamber 7 through intake port 5. The combustion gases are exhausted through exhaust port 6 in the conventional manner during the downward stroke of the piston.

The cylinder is closed by a cylinder head 8 firmly bolted in place by means of strong steel bolts 9. The cylinder head 8 is also made of 7.7 INCOLOY 909 TM alloy. This alloy has a low thermal coefficient of expansion which is approximately twice that of silicon nitride.

An axial bore 10 in the cylinder head 8 leads to a domed cavity forming a pre-combustion chamber 11. The shape shown can vary and is merely illustrative of a typical shape. A second bore 12 also leads at an angle from the surface of the cylinder block 8 to the pre-combustion chamber 11. The bore 10 accommodates a fuel injection nozzle 30, and the bore 12 accommodates a glow plug for facilitating starting. The glow plug (not shown) is only active during the starting phase.

A dish-shaped cavity that receives a complementary-shaped block 13 of silicon nitride based composite (KN3) is formed in the lower surface of the cylinder head 8. This material has the ability to withstand high temperatures, in the order of 1300° C. or more, and more importantly to retain heat. The block 13 is surrounded by a layer of thermal insulation 14 lining the receiving cavity, the thermal insulation 14 being made of zirconia or other suitable zirconia-based materials. It will thus be seen that the pre-combustion chamber 11 is formed wholly within the silicon nitride block 13.

Thermally insulating plate 14, also of zirconia or other zirconia-based material, is located on the top of the piston 3. Mounted on this plate 14 is a mass of silicon nitride composite (KN3) 15 forming a nipple-shaped protrusion 16, which partly enters the pre-combustion chamber 11 at the top of the stroke of the piston (TDC), and a frusto-conical base 17 covered on its bevelled surface by a layer 18 of thermally insulating material, also of zirconia or a zirconium based compound.

A ring of 7.7 INCOLOY 909 TM alloy 19 having a central aperture with bevelled side walls complementary to the bevelled walls of the base 17 is bolted onto the piston 3 by means of strong steel bolts 20 extending through the insulating plate 14. The ring 19 when compressed against the plate 14 by the bolts 20 thus serves to wedge the heat retaining mass 15 firmly in place on the insulating plate 14, which in turn is held tightly onto the top of the piston.

In order to make an engine run satisfactorily and cleanly on diesel or similar kerosene-based fuels, it is essential that the combustion temperature remain high for combustion initiation by surface ignition and improved end gas burning. The same is true for non-petroleum based fuels such as methanol and ethanol. In conventional diesel engines, this requirement is met by maintaining a high compression ratio, in the order of 22:1 for naturally aspirated engines, as a result of which the engine has to be made strong enough and sturdy enough to withstand the high combustion forces involved.

The present engine is designed to run at a compression ratio of about 14/15:1 or lower, which is more usual for a conventional two-stroke gasoline engine.

In the engine shown in the drawing, the silicon nitride block 13, instead of being designed to dissipate heat, as in a conventional engine, is designed to retain heat and maintain a relatively high temperature, as much as 900° C. The small numbers in the drawings show a typical temperature profile in °C. for the various components. The use of a material with a high heat retention ability, and an ability to withstand high temperatures, such as silicon nitride, enables this result to be achieved. The insulating layer 14 further promotes the maintenance of the high temperature within the silicon nitride block 13. The 7.7 INCOLOY 909 TM surrounding block 8, with its low coefficient of expansion, can comfortably accommodate the insulated block 13 at a temperature of about 900° C.

At the end of the power stroke, a charge of high pressure air is blown into the combustion chamber 7 through the intake port 5 and compressed this pushes the last of the exhaust gases out of the exhaust port and then the new charge of air is into the pre-combustion chamber 11 as the piston moves upward, which is reduced in volume by the nipple 16 of the mass 15. At this point a charge of fuel is injected from the fuel injector in bore 10. This ignites quickly due to the very high temperature brought about by the compression of the heated air as a result of the high temperature of the surrounding block 13 of silicon nitride. Combustion takes place and temperatures in the order of 900° to 1300° C. can occur within the combustion gases.

As the combustion process proceeds, the expanding gases force the piston downward, causing the nipple 16 to leave the pre-combustion chamber 11, providing a variable geometry type pre-combustion chamber for the cylinder. The variable geometry configuration has a number of advantages. In particular, the variable geometry reduces aerodynamic losses as the gases expand.

The proximity of the piston protrusion 16 to the combustion gases in the pre-combustion chamber 11 causes the mass 15 to heat up to a high temperature of about 400°-700° C. The heat retention ability of this material causes this temperature, which is about twice the normal temperature of the surface of a piston in the diesel engine, to be maintained. The 7.7 INCOLOY 909 TM ring 19 surrounding the mass 15, which is in contact with the cylinder wall 1, maintains a much more normal temperature, in the order of 350° to 400° C. The ring 19 accommodates conventional piston rings 21, of cast iron or mild steel.

As the downward power stroke of the piston continues, the burning gases are continuously maintained in contact with the high temperature mass 15 in the central region of the piston. This ensures continuation of the combustion process as the gases expand, resulting in clean burning and minimal exhaust emissions.

The described engine is similar in design to a conventional gasoline fueled, air cooled, two-cycle, 1 to 2 kilowatt power, spark ignition engine, but with the cylinder modified in the manner described to employ direct fuel injection. Preferably, a Yanmar, Lucas or Stanadyne pencil injector nozzle concept is used in the combustion chamber. A separate lubrication oil pump is required for piston and bearing lubrication.

Preferably, fuel is injected a few degrees before top dead centre. The fuel ignites immediately due to the high surface temperatures in the pre-combustion chamber. This high surface temperature also means that high levels of turbulence are not as necessary to ensure good combustion, as is the case in other engine designs, and by designing the precombustion chamber for less turbulence, aerodynamic and heat transfer losses can be further reduced.

The high surface temperature also reduces ignition delay and aerodynamic losses are reduced between the pre-combustion chamber and main chamber. End gas burning is improved as a result of the presence of the mass 15 on the piston.

As in a conventional two-stroke engine, crank case compression can be used to provide the initial charge of compressed air to assist in pushing the exhaust gasses out of the exhaust port. The engine does not require a forced air cooling system, and unlike conventional engines is insulated in many areas to conserve heat or assist in even temperature distribution.

The 7.7 INCOLOY alloy 909 high temperature material is of very high strength, low coefficient of expansion and is suitable for mating with silicon nitride composite material used in the pre-combustion chamber and on the piston. The thermal conductivity of the silicon nitride is similar to INCOLOY 909 TM, although the thermal coefficient of expansion of silicon nitride is about half that of INCOLOY 909 TM. In terms of its high temperature characteristics, INCOLOY 909 is capable of maintaining its high strength temperatures up to about 650° C. and silicon nitride up to about 1300° C.

The carbon steel casing 2, which promotes a more even temperature distribution around the INCOLOY liner, can be insulated with a insulating jacket to further assist the development of an even temperature distribution throughout the length of the cylinder liner.

The shape of the piston protrusion 16, which in the drawings is illustrative of a typical shape only, is selected so that in addition to providing a variable geometry, low aerodynamic loss design for the precombustion chamber, it also provides a deflection function, i.e. it directs exhaust gases away from the top of the piston so as to assist in maintaining the relatively lower temperature for the ring 19 relative to the mass 15. The mass 15 and ring 19 will expand radially at nearly the same rate over the engine speed/load operating range.

The piston ring, which is placed in ring 19, is maintained as high as possible on the piston to avoid end gas entrapment in the ring crevice volume. An oil control ring is used in the lower skirt area of the piston. The lubricating oil should be able to withstand high temperatures, of up to 400 degrees C.

The above piston-cylinder head configuration has been described with reference to a two-stroke engine. However, the invention is equally applicable to four-stroke engines, since the use of a heat retaining block within the cylinder head cooperating with a heat retaining mass on the piston can be used to advantage in such engines to increase temperatures and reduce compression ratios, thereby enabling a more lightweight engine to be manufactured.

The described engine is particularly useful for lightweight applications, such as air borne portable generator sets. The engine should be able to run on NATO-fuel type F-34, which is similar to JP-8 aviation fuel. Because of the hazards associated with the high volatility of gasoline, gasoline engines cannot be employed in such environments, whereas the engine constructed in accordance with the present invention can.

I claim:

1. A piston and cylinder arrangement for an internal combustion engine designed to run on diesel and similar fuels, comprising a cylinder defining a main combustion chamber, a piston reciprocatable within said cylinder and having a thermally insulating plate on its upper surface, a cylinder head including a precombustion chamber, a fuel injector for injecting fuel into said precombustion chamber, a thermally insulated block of material with high heat retention ability surrounding said precombustion chamber to maintain a high temperature in the order of 500° C. in said precombustion chamber and thereby facilitate fuel ignition at moderate compression ratios, and a mass of material with high heat retention ability mounted on the insulated surface of said piston so as to remain at a high temperature during running of the engine and facilitate the combustion process during the downward stroke of the piston, said mass of material on the piston protruding so as to enter the precombustion chamber and provide a variable geometry combustion chamber when the piston is at the top of its stroke, and said protruding mass on the piston being surrounded by means with lower heat retention ability that maintains a lower temperature during normal running of the engine.

2. A piston and cylinder arrangement for an internal combustion engine designed to run on diesel and similar fuels, comprising a cylinder defining a main combustion chamber, a piston reciprocatable within said cylinder and having a thermally insulating plate on its upper surface, a cylinder head including a precombustion chamber, a fuel injector for injecting fuel into said precombustion chamber, a thermally insulated block of material with high heat retention ability surrounding said precombustion chamber to maintain a high temperature of at least about 500° C. in said precombustion chamber and thereby facilitate fuel ignition at moderate compression ratios, and a mass of material with high heat retention ability mounted on the insulated surface of said piston so as to remain at a high temperature during running of the engine and facilitate the combustion process during the downward stroke of the piston, said mass of material on the piston protruding so as to enter the precombustion chamber and provide a variable geometry combustion chamber when the piston is at the top of its stroke, and said protruding mass on the piston being surrounded by a ring of material with lower heat retention ability that maintains a lower temperature during normal running of the engine.

3. A piston and cylinder arrangement for an internal combustion engine as claimed in claim 2, wherein the thermally insulated block of material covers substantially the whole of the top surface of the cylinder.

4. A piston and cylinder arrangement for an internal combustion engine as claimed in claim 2, wherein said protruding mass on the piston comprises a nipple-shaped protrusion protruding from a frusto-conical base, and said base is located in an aperture of complementary shape in said ring so that the protruding mass on the piston is wedged into position.

5. A piston and cylinder arrangement for an internal combustion engine as claimed in claim 4, wherein said insulating plate is bolted onto said upper surface by means of bolts recessed into said ring of material with lower heat retention ability.

6. A piston and cylinder arrangement for an internal combustion engine as claimed in claim 2, wherein said mass of material in the cylinder head is surrounded by thermal insulation to minimize heat transfer to other parts of the engine.

7. A piston and cylinder arrangement for an internal combustion engine as claimed in claim 2, wherein said material with high heat retention ability is selected from the group consisting of: a silicon nitride or silicon carbide based composite, and a high-temperature metal alloy.

8. A piston and cylinder arrangement for an internal combustion engine as claimed in claim 2, wherein said thermally insulating plate is made of a zirconia-based insulating material.

9. A piston and cylinder arrangement for an internal combustion engine as claimed in claim 2, wherein the cylinder head and cylinder walls are made of a nickel-iron-cobalt alloy having a substantially constant, low coefficient of expansion.

10. A piston and cylinder arrangement for an internal combustion engine as claimed in claim 2, wherein said thermally insulating block and said protruding mass are made of the same material.

11. A piston and cylinder arrangement for an internal combustion engine as claimed in claim 2, wherein said precombustion chamber is generally dome-shaped shape and said protruding mass has a shape substantially complementary thereto.

12. A piston and cylinder arrangement for an internal combustion engine as claimed in claim 2, comprising opposed inlet and exhaust ports in a wall of said cylinder to provide a two-stroke configuration for said engine.

* * * * *